(12) United States Patent
Potvin et al.

(10) Patent No.: US 11,592,837 B1
(45) Date of Patent: Feb. 28, 2023

(54) SYSTEMS AND METHODS TO CONTROL GAIN FOR AN ELECTRIC AIRCRAFT

(71) Applicant: BETA AIR, LLC, South Burlington, VT (US)

(72) Inventors: Jordan Potvin, South Burlington, VT (US); Jacob Nealy, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/515,423

(22) Filed: Oct. 30, 2021

(51) Int. Cl.
  *G05D 1/06* (2006.01)
  *B64C 39/02* (2006.01)
(52) U.S. Cl.
  CPC ......... *G05D 1/0676* (2013.01); *B64C 39/024* (2013.01); *B64C 2201/141* (2013.01)
(58) Field of Classification Search
  CPC .................................................. G05D 1/0676
  See application file for complete search history.

(56) References Cited

U.S. PATENT DOCUMENTS

| | | | |
|---|---|---|---|
| 8,473,124 B2 | 6/2013 | Shue | |
| 9,902,495 B2* | 2/2018 | Phan | B64C 39/024 |
| 9,958,874 B2 | 5/2018 | Yu | |
| 10,200,241 B2* | 2/2019 | Shen | H04L 41/0806 |
| 10,877,487 B2 | 12/2020 | Irwin, III | |
| 10,953,754 B1* | 3/2021 | Wiegman | B60L 50/50 |
| 11,059,598 B2* | 7/2021 | Arkus | B64D 27/08 |
| 11,142,333 B1* | 10/2021 | Richter | G05D 1/0858 |
| 11,174,021 B2* | 11/2021 | Anderson | B64C 39/022 |
| 2013/0261853 A1* | 10/2013 | Shue | G05D 1/0088 |
| | | | 701/3 |
| 2018/0135798 A1 | 5/2018 | Griffin | |
| 2020/0277080 A1 | 9/2020 | Wiegman | |
| 2021/0070457 A1 | 3/2021 | Wiegman | |

FOREIGN PATENT DOCUMENTS

| | | | |
|---|---|---|---|
| CN | 107589668 A | 1/2018 | |
| WO | WO-2014209220 A1 * | 12/2014 | G05D 1/0011 |

OTHER PUBLICATIONS

Qiao, Jing, Gain Scheduling PID Control for Quad Rotor Helicopter, Diagnosis, Flight Control and Simulation Lab (DFCSL) and Networked Autonomous Vehicles Lab (NAVL), at Concordia University (https://ieeexplore.ieee.org/stamp/stamp.jsp?tp=&arnumber=8278414) (2017)(hereinafter "Qiao").*

(Continued)

*Primary Examiner* — Jean Paul Cass
(74) *Attorney, Agent, or Firm* — Caldwell Intellectual Property Law

(57) ABSTRACT

Systems and methods to control gain of an electric aircraft are provided in this disclosure. The system may include gain scheduling to provide stability of the electric aircraft at various dynamic states of operation. The system may include a sensor to obtain measurement datum of an operating state. The system may further include a controller that adjusts a control gain of the electric aircraft as a function of the measurement datum. The gain control may be determined by a gain schedule generated by the controller.

18 Claims, 7 Drawing Sheets

(56) References Cited

OTHER PUBLICATIONS

NPL, Shamma, Jeff et al., Gain-Scheduled Missile Autopilot Design Using Linear Parameter Varying Transformations, Journal of Guidance, Control, and Dynamics vol. 16, No. 2, Mar.-Apr. 1993, (https://arc.aiaa.org/doi/pdf/10.2514/3.20997).*

Thompson, Derek, Robust Control of EVTOL through Transition with a Gain Schedulign LQR Controller, University of Maryland Master Thesis (2020).*

Perry, Aaron et al., System Identification and Modeling of Distributed Electric Propulsion Aircraft, University of Illinois at Urbana-Champaign, Department of Aerospace Engineering, Urbana, IL 61801, AIAA Aviation, Jun. 17, 2019 forum (https://arc.aiaa.org/doi/pdf/10.2514/6.2019-3086).*

Thompson, Robust Control of an Evtol Through Transition With a Gain Scheduling LQR Controller, Dec. 31, 2020.

Willis, Trajectory Gener y Generation and T ation and Tracking Contr acking Control for Winged Electric ol for Winged Electric Vertical T tical Takeoff and Landing Air eoff and Landing Aircraft, Apr. 16, 2021.

Sobiesiak et al., Modelling and Control of Transition Flight of an eVTOL Tandem Tilt-Wing Aircraft, Dec. 31, 2019.

* cited by examiner

SYSTEMS AND METHODS TO CONTROL GAIN FOR AN ELECTRIC AIRCRAFT

FIELD OF THE INVENTION

The present invention generally relates to the field of electric aircrafts. In particular, the present invention is directed to systems and methods to control gain for an electric aircraft.

BACKGROUND

Along with the development of using electric energy to power aircrafts, the ability to incorporate automated features in operation of electric aircrafts has become desirable. Electric aircrafts have complex mobility systems and, thus, controlling gain of an electric aircraft has proven challenging.

SUMMARY OF THE DISCLOSURE

In an aspect, a system to control gains for an electric aircraft, the system includes: a controller communicatively connected to a sensor, the controller configured to: receive a measurement datum from the sensor; determine an operating point of the electric aircraft as a function of the measurement datum; and adjust a control gain of the electric aircraft as a function of a gain schedule, wherein the gain schedule comprises: a first operating range, wherein if an operating point is within a first operating range then gain control is configured to be adjusted linearly and directly scaled; and a second operating range, wherein if an operating point is within the second operating range then gain control is configured to be adjusted based on a generated attitude command that pitches the electric aircraft upward by a predetermined angle.

In another aspect, a method to control gains for an electric aircraft, the method including: receiving, by a controller communicatively connected to a sensor, a measurement datum; determining, by the controller, an operating point of the electric aircraft as a function of the measurement datum; and adjusting, by the controller, a control gain of the electric aircraft as a function of a gain schedule, wherein the gain schedule comprises: a first operating range, wherein if an operating point is within a first operating range then gain control may be adjusted linearly and directly scaled; and a second operating range, wherein if an operating point is within the second operating range then gain control may be adjusted based on a generated attitude command that pitches the electric aircraft upward by a predetermined angle.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
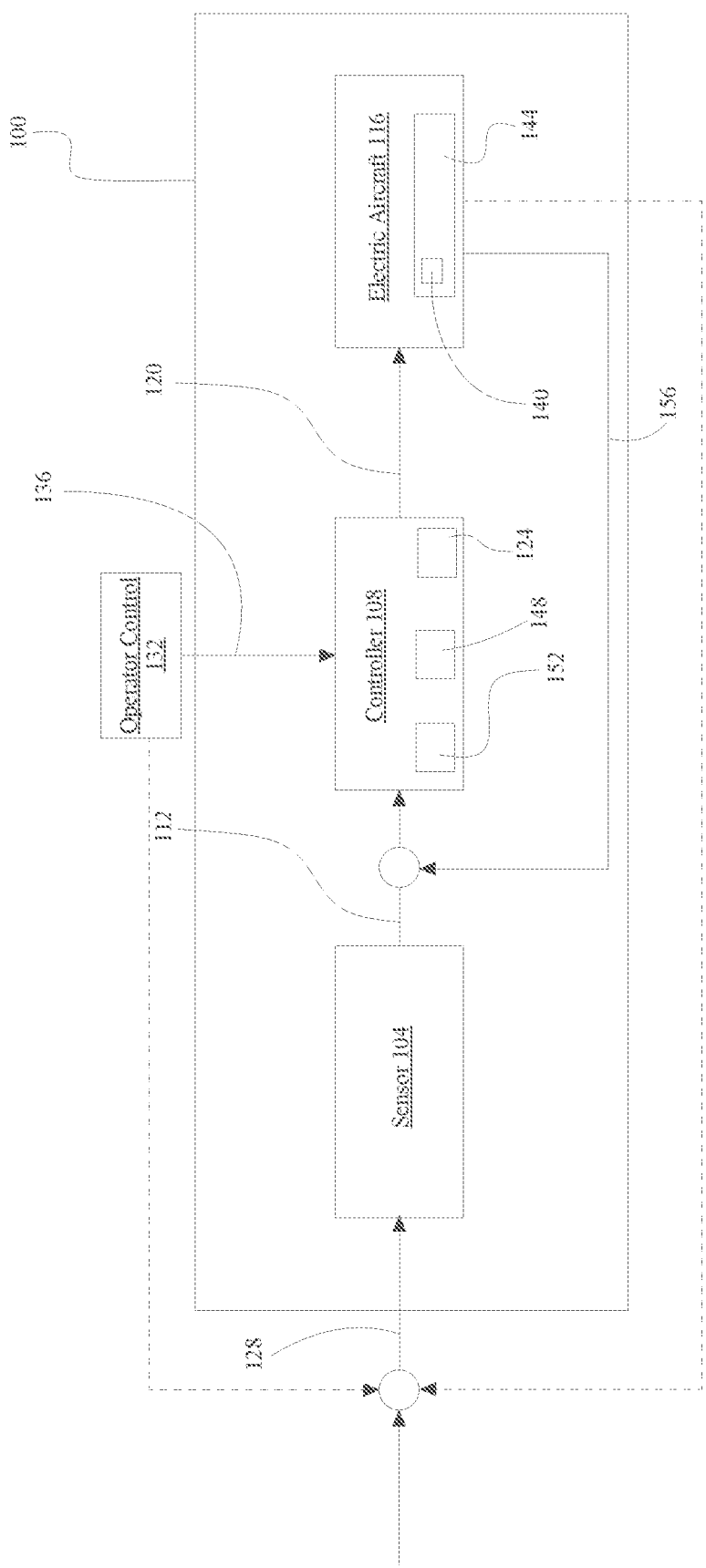
FIG. 1 is a block diagram of an exemplary embodiment of a system to control gain for an electric aircraft in accordance with one or more aspects of the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods to control gain of an electric aircraft. More specifically, the present disclosure may be used to execute a landing flare by an electric aircraft using gain scheduling. Conventionally, gains remain the same for the duration of an operation. However, electric aircrafts, such as drones, have complex operations that make solely using a linear control method challenging. Therefore, gain scheduling may be utilized with mobile structures, such as electrical vehicles, which experience changing plant dynamics during system operations since gain scheduling is an effective approach with gradual adaptation of a control system. Instead of being restricted to a linear control method, such as with use of a single proportional-integral-derivative (PID) controller, gain scheduling allows for control of nonlinear processes of a system. Thus, the present disclosure provides a system and methods for controlling gain of an electric aircraft using a generated gain schedule.

In one or more embodiments, input to control gains includes lift throttle. For example, and without limitation, propellers of a drone may spin to generate lift, where the spin speed of the propellers is controlled by an operator input. In other embodiments, if the electric vehicle is entirely autonomous, then input to control gains may include airspeed. In one or more embodiments, a sensor may be used to detect various operation characteristics of electric vehicle. For example, and without limitation, an inertial measurement unit may be used to measure a rotational translation of electric aircraft about its center of gravity, such as the pitch, roll, and yaw of electric aircraft 116. An attitude change during deceleration may be made. For example, during flight, an electric aircraft may pitch up to decrease the speed of the aircraft as the altitude of the aircraft decreases (i.e. flaring). Such a maneuver is beneficial for a drone since less lift is required as the drone descends, which makes a handoff to multicopter mode easier due to a lowered airspeed and reduced vibrations from the motors. This allows for a softer landing. For example, if a drone is delivering a package and/or parcel.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes in FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Now referring to FIG. 1, a block diagram of an exemplary embodiment of a system 100 to control gains for an electric aircraft is shown in accordance with one or more embodiments of the present disclosure. In one or more embodiments, system 100 includes a controller 108. In one or more embodiments, system 100 may also include a sensor 104 that is communicatively connected to controller 108. In one or more embodiments, sensor 104 may be configured to obtain a measurement datum 112 of an electric aircraft 116. For the purposes of this disclosure, a "measurement datum" is an electronic signal representing an information and/or a parameter of a detected electrical and/or physical phenomenon correlated with an electric aircraft operation. For example, and without limitation, a measurement datum 112 may include a lift throttle of electric aircraft 116. In another example, and without limitation, measurement datum 112 may include an airspeed of electric aircraft 116. In one or more embodiments, an airspeed sensor may be used to detect an airspeed characteristic of electric aircraft 116. For example, an airspeed sensor may include a pitot tube, a temperature sensor, and or a pressure sensor to obtain information regarding an airspeed of electric aircraft 116. In one or more embodiments, measurement datum 112 may be transmitted by sensor 104 to controller 108 so that controller 108 may receive measurement datum 112, as discussed further in this disclosure. As used in this disclosure, a "sensor" is a device that is configured to detect an input and/or a phenomenon and transmit information related to the detection. For instance, and without limitation, sensor 104 may detect an input 128. Input 128 may be from operator control 132, electric aircraft 116, environmental characteristics, and the like. In one or more embodiments, the information detected by sensor 104 may be transmitted in the form of an output sensor signal. For example, and without limitation, a sensor may transduce a detected phenomenon, such as and without limitation, a pitch angle of an electric aircraft, into a sensed signal.

Still referring to FIG. 1, in one or more embodiments, sensor 104 may receive an input 128 from electric aircraft 116. Thus, sensor 104 may detect a plurality of characteristics about electric aircraft 116. For example, and without limitation, operation characteristics of electric aircraft 116 may be detected by sensor 104 that include position, orientation, geographical location, airspeed, and the like. In one or more embodiments, and without limitation, sensor 104 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, airspeed sensors, throttle position sensors, and the like. Sensor 104 may be a contact or a non-contact sensor. For example, and without limitation, sensor 104 may be connected to electric aircraft 116. In other embodiments, sensor 104 may be remote to electric aircraft 116. Sensor 104 may be communicatively connected to controller 108, which may include a computing device, processor, pilot control, control circuit, and/or flight controller so that sensor 104 may transmit/receive signals to/from controller 108, respectively. Signals, such as signals of sensor 104 and controller 108, may include electrical, electromagnetic, visual, audio, radio waves, or another undisclosed signal type alone or in combination. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit.

In one or more embodiments, sensor 104 may include an inertial measurement unit (IMU). In one or more embodiments, an IMU may be configured to detect a change in specific force of a body. An IMU may include an accelerometer, a gyro sensor, a magnetometer, an E-compass, a G-sensor, a geomagnetic sensor, and the like. An IMU may be configured to measurement datum 112. Obtaining measurement datum 112 may include the IMU detecting an aircraft angle. Measurement datum 112 may include a desired attitude or rate of attitude change. An aircraft angle may include any information about the orientation of the aircraft in three-dimensional space such as pitch angle, roll angle, yaw angle, or some combination thereof. In non-limiting examples, an aircraft angle may use one or more notations or angular measurement systems like polar coordinates, Cartesian coordinates, cylindrical coordinates, spherical coordinates, homogenous coordinates, relativistic coordinates, or a combination thereof, among others.

With continued reference to FIG. 1, in one or more embodiments, sensor 104 and/or controller 108 may be configured to obtain a performance datum 156. A "performance datum," for the purposes of this disclosure, is an element or signal of data that represents physical parameters of individual actuators and/or flight components of an electric aircraft. Performance datum 156 may include a measured torque parameter that may include the remaining vehicle torque of a flight component among a plurality of flight components. A "measured torque parameter," for the purposes of this disclosure, refer to a collection of physical values representing a rotational equivalence of linear force. A person of ordinary skill in the art, after viewing the entirety of this disclosure, would appreciate the various physical factors in measuring torque of an object. For instance, and without limitation, remaining vehicle torque may be consistent with disclosure of remaining vehicle torque in U.S. patent application Ser. No. 17/197,427 and titled "SYSTEM AND METHOD FOR FLIGHT CONTROL IN ELECTRIC AIRCRAFT", which is incorporated herein by reference in its entirety. Remaining vehicle torque may include torque available at each of a plurality of flight components at any point during an aircraft's entire flight envelope, such as before, during, or after a maneuver. For example, and without limitation, torque output may indicate torque a flight component must output to accomplish a maneuver; remaining vehicle torque may then be calculated based on one or more of flight component limits, vehicle torque limits, environmental limits, or a combination thereof. Vehicle torque limit may include one or more elements of data representing maxima, minima, or other limits on vehicle torques, forces, attitudes, rates of change, or a combination thereof. Vehicle torque limit may include individual limits on one or more flight components, structural stress or strain, energy consumption limits, or a combination thereof. Remaining vehicle torque may be represented, as a non-limiting example, as a total torque available at an aircraft level, such as the remaining torque available in any plane of motion or attitude component such as pitch torque, roll torque, yaw torque, and/or lift torque. Controller 108 may mix, refine, adjust, redirect, combine, separate, or perform other types of signal operations to translate pilot desired trajectory into aircraft maneuvers. In a nonlimiting embodiment a pilot may send a pilot input at a press of a button to capture current states of the outside environment and subsystems of the electric aircraft to be displayed onto an output device in operator view. The captured current state may further display a new focal point based on that captured current state. Controller 108 may condition signals such that they can be sent and received by various components throughout the electric vehicle.

Sensor 104 may include a plurality of sensors that may be configured to measure, detect, and/or sense a change in an atmosphere. In some embodiments, sensor 104 may include one or more motion sensors. Motion sensors may be selected to detect motion in three directions spanning three dimensions. For instance, and without limitation, a set of three accelerometers may be configured or arranged to detect acceleration in three directions spanning three dimensions, such as three orthogonal directions, or three gyroscopes may be configured to detect changes in pitch spanning three dimensions, such as may be achieved by three mutually orthogonal gyroscopes. Sensor 104 may include one or more environmental sensors, including without limitation sensors for detecting wind, speed, temperature, or the like.

Sensor is configured to obtain measurement datum 112 of electric aircraft 116, which may include a speed, acceleration, an orientation, a position, or the like, of electric aircraft 116 and/or of a flight component of electric aircraft 116. For example, and without limitation, measurement datum 112 may include a current position, a current pitch angle, a current yaw angle, a current roll angle, or the like, of each rotor of electric aircraft 116.

In one or more embodiments, sensor 104 may include a navigation system. For example, and without limitation, sensor 104 may include a satellite navigation system such as a global positioning system (GPS), a Galileo positioning system or a global navigation satellite system (GLONASS), an assisted global positioning system (AGPS), or the like, to assist with obtaining a geographical position of a flight component and/or electric aircraft 116. In some embodiments, sensor 104 may include an altimeter. An altimeter may be configured to measure an altitude. In some embodiments, an altimeter may include a pressure altimeter. In other embodiments, an altimeter may include a sonic, radar, and/or Global Positioning System (GPS) altimeter. Sensor 104 may include an anemometer. The anemometer may be configured to detect a wind speed. In some embodiments, the anemometer may include a hot wire, laser doppler, ultrasonic, and/or pressure anemometer. In some embodiments, the altimeter may be configured to detect an altitude of an electric aircraft.

In one or more embodiments, sensor 104 may include electrical sensors. Electrical sensors may be configured to measure voltage across a component, electrical current through a component, and resistance of a component. Electrical sensors may include separate sensors to measure each of the previously disclosed electrical characteristics such as a voltmeter, ammeter, and ohmmeter.

In one or more embodiments, sensor 104 may include a plurality of sensors in the form of individual sensors or a sensor working individually. A sensor may include a plurality of independent sensors, as described herein, where any number of the described sensors may be used to detect any number of physical and/or electrical quantities associated with an aircraft subsystem. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 104 to detect phenomenon may be maintained. In a non-limiting example, a user may alter aircraft usage pursuant to sensor readings.

Still referring to FIG. 1, sensor 104 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with electric aircraft 116. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. At least a sensor may be configured to detect pilot input 136 from at least pilot control 132. An operator control 132 may generate an operator input 136. For example, and without limitation, operator control 132 may include a collective input. In another example, and without limitation, an operator control 132 may include an inceptor stick, for example, that translates a desired action of an operator into electrical signals to, for example, flight components 140, which move in a way that manipulates a fluid medium, like air, to accomplish the operator's desired maneuver. Operator control 132 may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety.

Still referring to FIG. 1, system 100 includes controller 108, which is communicatively connected to sensor 104. In one or more embodiments, controller 108 is configured to receive real-time measurement datum 112. Thus, measurement datum 112 may be an input of controller 108. For example, and without limitation, measurement datum 112 may include a lift throttle of electric aircraft 116 if electric aircraft 116 is controlled by an operator, such as operator control 132 that generates an operator input 136. For example, and without limitation, an operator control may include a collective input. In one or more exemplary embodiments, an operator control 132 may include an inceptor stick, for example, that translated a desired action of the pilot into electrical signals to, for example, flight components, which move in a way that manipulates a fluid medium, like air, to accomplish the operator's desired maneuver. In another example, and without limitation, measurement datum 112 may include an airspeed of electric aircraft 116 if electric aircraft 116 is automated. In another example, and without limitation, measurement datum 112 may include an angle of electric aircraft, such as an angle of attack (AoA), and/or an angle of each rotor. In one or more embodiments, measurement datum 112 may include operating conditions of plant dynamics, such as, for example, during operation of electric aircraft 116, to attenuate parameter variation and uncertainties.

In one or more embodiments, controller 108 may be communicatively connected to sensor 104 and flight component 140. For example, and without limitation, controller 108 may be communicatively connected to a plurality of rotors 144 of electric aircraft 116. In one or more embodiments, controller 108 may include a computing device (as discussed in FIG. 7), a flight controller (as discussed in FIG. 5), a central processing unit (CPU), a microprocessor, a digital signal processor (DSP), an application specific integrated circuit (ASIC), and combination thereof, or the like. In one or more embodiments, controller 108 is configured to generate aircraft command 120 and thus execute all operations of flight component of electric aircraft 116. In one or more embodiments, outputs from sensor 104 or any other component present within system 100 may be analog or digital. Onboard or remotely located controller 108 may convert those output signals from sensor to a usable form by the destination of those signals. The usable form of output signals from sensors, through processor may be either digital, analog, a combination thereof, or an otherwise unstated form. Processing may be configured to trim, offset, or otherwise compensate the outputs of sensor. Based on sensor output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

Still referring to FIG. 1, controller 108 is configured to determine an operating point 124 of electric aircraft 116 as a function of measurement datum 112. For the purposes of this disclosure, an "operating point" is a current state of an operating condition of an electric aircraft. For instance, an operating point may include an orientation or airspeed of electric aircraft 116 and/or individual flight components of electric aircraft 116. For example, and without limitation, an operating point 124 may be a specific numerical value representing an airspeed of electric aircraft 116 in the case of electric aircraft being operated by automated means. In such as case, a measurement datum 112 may include, for example, and without limitation, voltage datum, motion datum, flow measurement datum, air intake datum, and the like, which may be used by controller 116 to determine operating point 124. In another example, and without limitation, an operating point 124 may be a specific numerical value representing a throttle input of an operator. Sensor 104 may be configured to continuously detect measurement datum, do that controller 108 may be configured to continuously determine an operating point 124. As a result, system 100 may remain stabilized at all times during operation.

Using gain scheduling, each operating point may be associated with a preconfigured operating range 148. For the purposes of this disclosure, an "operating range" may be a set of numerical values having an upper limit and a lower limit that are associated with an operating condition of an electric aircraft. In one or more embodiments, operating ranges are representations of various process behaviors of electric aircraft 116. In one or more embodiments, each range may be associated with a preconfigured gain control to create gain scheduling. For the purposes of this disclosure, a "gain scheduling" is an approach used for controlling dynamic, non-linear systems. In one or more embodiments, gain scheduling may be used to linearize and nonlinear plant model at different operating points and/or conditions. This allows the nonlinear system to remain stabilized and perform desirably at each operating point. In one or more embodiments, a family of linear controllers may be used in conjunction to create a non-linear approach so that each linear controller provides an appropriate control for each operating point of the non-linear system. For instance, and without limitation, a database and or an algorithm, such as a differential equation, may be used so that controller 108 may determine the appropriate control gains for the given values of the scheduling variables, such as operating point 124, to achieve a desired performance objective, such as a flaring. In one or more embodiments, a machine-learning model may be used to determine one or more operating ranges 148 and corresponding operating points 124. In one or more exemplary embodiments, and without limitation, a gain schedule may include a first operating range that allows electric aircraft to operate as programmed or as instructed by an operator. In another example, and without limitation, gain schedule may include a second operating range that, when an operating point falls within the second operating range, a subsystem of electric aircraft 116 receives a corresponding aircraft command 120 from controller 108, as discussed further below in this disclosure. In one or more embodiments, an operating range 148 may be range set by, for example, a user or by a database. In one or more embodiments, a machine-learning model may be implemented to determine an operating range and/or operating point as a function of at least measurement datum. Gain scheduling may be a continuous gain scheduling technique or discrete gain scheduling. For example, for sensor and/or actuator failures, methods may be switched between dynamical regimes.

Still referring to FIG. 1, controller 108 is configured to adjust a gain control of electric aircraft 116 as a function of operating point 124 and operating range 148. As previously mentioned in this disclosure, controller may utilize gain scheduling to determine a gain control. Gain scheduling is a method for the control of a nonlinear system. A gain-scheduled controller may be constructed by interpolating between a plurality of linear controllers to control gain of dynamic, nonlinear systems. More specifically, a gain-scheduled controller may include a plurality of linear controllers derived for a corresponding set of plant linearizations associated with several operating points. In one or more embodiments, exogenous factors may be measured in real time, and as a function of the real-time measurements, gain scheduling may be determined. Gain scheduling may also include linear parameter varying (LPV) and linear fractional transformations (LFT) approaches, which take into consideration time variation. Gain scheduling may include offline linearization, which includes a scheduling variable, or may include online scheduling, which may include a function based in operating conditions. Gain scheduling may compensate for nonlinear dynamics over a range of operating conditions of an electric aircraft, as previously mentioned. Thus, gain scheduling may be utilized with electric aircrafts with changing plant dynamics during system operations, since gain scheduling is an effective approach for gradual adaptation of a control system. Instead of being restricted to a linear control method, such as a proportional-integral-derivative (PID) controller, gain scheduling allows for control of nonlinear processes of a system. In one or more embodiments, gain scheduling may be linear. In other embodiments, gain scheduling may be curved.

Controller 108 may utilize a machine-learning model that may predict and/or determine a gain schedule. The machine-learning model may be trained on a plurality of parameters and/or correlations therebetween, such as, but not limited to, airspeed, lift throttle, altitude, orientation, geographical location, and the like. In one or more embodiments, each parameter may be inputted into in the machine-learning model, where the machine-learning model may create a corresponding output, such as, for example, a corresponding gain control. For example, and without limitation, a specific airspeed may be an input, and a gain control altering the position of one or more flight component to adjust the orientation of the aircraft by a specific amount over a certain duration of time, such as pitching the aircraft nose upward and away from the ground, may be the output. A parameter may be inputted by a user, such as a user using a user interface such as a mobile device, aircraft display, tablet, laptop, and the like. In other embodiments, a parameter may be inputted by a sensor detecting the parameter in real-time, as described in this disclosure. In one or more embodiments, the inputs may be correlated with specific outputs using training data. For example, past flight maneuvers may be observed and stored in a memory component, such as a database, and used by machine-learning model to generate a gain schedule. The machine-learning model may be trained on a sequence of events that may take place in an optimal trajectory such as, but not limited to, a takeoff stage, a cruising stage, and a landing stage. The machine-learning model may be trained to prioritize one or more parameters in a plurality of parameters. In one embodiment, the machine-learning model may prioritize battery charge. In another embodiment, the machine learning model may prioritize throttle of electric aircraft 116. In some embodiments, the machine-learning model may be trained with constraints on parameters. In some embodiments, the machine-learning model may be trained with weighted parameters.

In one or more embodiments, an adjustment of a gain of electric aircraft 116 may include adjusting an attitude of electric aircraft 116. For instance, and without limitation, an attitude change of electric aircraft 116 may be made during deceleration of electric aircraft 116. For example, and without limitation, a measurement datum 112 may include a low airspeed. Controller 108 may receive measurement datum 112 and determine an operating point 124, a specific airspeed or an acceleration of electric aircraft 116, such as a decreasing airspeed during flight in preparation for a landing. The low airspeed of electric aircraft 116 may fall within an operating range associated with a specific gain control, such as the movement of one or more flight components of electric aircraft 116 further, so that aircraft pitches up, which naturally decreases the speed of electric aircraft 116. For example, and without limitation, as the altitude of an aircraft decreases gain-scheduled controller 108 may enable electric aircraft to pitch up to decrease the speed of the electric aircraft to allow for a gentle landing which may be useful for an aircraft containing damageable cargo. Such a maneuver may be beneficial for a drone since less lift is required as the drone descends, which makes a handoff to multicopter mode easier due to a lowered airspeed and reduced vibrations from the motors. This, thus, allows for a gentler landing, for example, in the case of a drone delivering a package.

In one or more embodiments, adjusting the control gain of electric aircraft 116 includes transmitting an aircraft command 120 to a flight component 140 of electric aircraft 116. Aircraft command 120 may be an electrical signal configured to be transmitted to at least a portion of electric aircraft 116, namely flight component of electric aircraft 116, which is attached to electric aircraft 116 so that flight component 140 may manipulate a fluid medium to change the pitch, roll, yaw, or throttle of electric aircraft 116 when moved. In one or more embodiments, controller 108 may transmit a signal including aircraft command 120 to a plurality of flight components of electric aircraft 116. In one or more embodiments, aircraft command 120 may include instructions for adjustment of attitude parameters of electric aircraft 116. In one or more embodiments, aircraft command 120 includes an attitude change during a deceleration of electric aircraft 116. In one or more embodiments, an attitude change may include a landing flare maneuver. For the purposes of this disclosure, a "landing flare", or a round out, is a maneuver or stage during a landing of an aircraft, where the nose of an electric aircraft is raised, slowing the descent rate of the electric aircraft and, therefore, creating a softer touchdown while the proper attitude is set for touchdown.

For instance, and without limitation, a rotor of electric aircraft 116 may be adjusted based on received aircraft command 120. For example, and without limitation, aircraft command 120 may be received by an actuator or motor of flight component, which is then moved in response to received aircraft command 120. In another example, and without limitation, a four-rotor drone may receive an aircraft command that instructs each rotor to move to a specific position.

In one or more embodiments, controller 108 is communicatively connected to each actuator and/or flight component of electric aircraft 116. In one or more embodiments, actuators of flight component may include a conversion mechanism configured to convert the electrical signal from controller 108 to a mechanical movement of flight component. As a non-limiting example, controller 108 may transmit signals to flight components via an electrical circuit connecting controller 108 to flight components 140. The circuit may include a direct conductive path from controller 108 to flight components 140 or may include an isolated connection, such as an optical or inductive connection. Alternatively, or additionally, controller 108 may communicate with flight component using wireless communication, such as without limitation communication performed using electromagnetic radiation including optical and/or radio communication, or communication via magnetic or capacitive connection. Controller 108 may be fully incorporated in aircraft or may be a remote device operating the aircraft remotely via wireless or radio signals, or may be a combination thereof, such as a computing device in the aircraft configured to perform some steps or actions described in this disclosure while a remote device is configured to perform other steps. Persons skilled in the art will be aware, after reviewing the entirety of this disclosure, of many different forms and protocols of communication that may be used to communicatively connect controller 108 to flight component 140. In one or more embodiments, flight component 140 may include an aerodynamic surface. In one or more exemplary embodiments, the aerodynamic surface may be an aileron, an edge slat, an elevator, a rudder, balance and anti-balance tabs, flaps, spoilers, a trim, or a mass balance. In other embodiments, flight component may include propulsors, and/or a propulsion system, such as a rotor or propeller.

With continued reference to FIG. 1, controller 108 may include an outer loop controller. Outer loop controller may include one or more computing devices consistent with this disclosure and/or one or more components and/or modules thereof. Outer loop controller may be implemented using a microcontroller, a hardware circuit such as an FPGA, system on a chip, and/or application specific integrated circuit (ASIC). Outer loop controller may be implemented using one or more analog elements such as operational amplifier circuits, including operational amplifier integrators and/or differentiators. Outer loop controller may be implemented using any combination of the herein described elements or any other combination of elements suitable therefor. Outer loop controller may be configured to input one or more parameters, such as measurement datum 112. Outer loop controller may periodically detect one or more errors between aircraft angles and commanded angles in any one of pitch, roll, yaw, or a combination thereof. For example, and without limitation, outer loop controller may detect the error between the commanded and detected aircraft angle and command flight component 140 to reduce said error in one or more iterations. Outer loop controller may be closed by a PI controller with integral anti-windup via back-calculation. Additional logic is present to prevent integral windup while grounded on a not perfectly level surface. Gains may be reduced at large amplitude in order to reduce overshoot on large inputs. This excessive overshoot may be due in part to linear systems having constant percent overshoot, so at larger amplitudes, the absolute value of the overshoot becomes (potentially unacceptably) large. Additionally, on large step inputs, motor saturation (a nonlinear effect) may occur for extended periods of time and causes overshoot to increase. In extreme cases, the occurrence of motor saturation without any gain reduction may lead to unrecoverable tumbles. This gain reduction may be implemented as a (soft) rate command limit. In particular, this reduction may be given by the piecewise combination of a linear function and the square root function. Note that the input/output relationship may be monotonically increasing, so increased angle error or integral action always makes it through to the inner loop, even if the gain reduction may be engaged. For inputs less than the knee, set to 20 deg/s, the input may be not changed. Above the knee, the output may be given by sign(input)*sqrt(abs(input)*knee). The effective gain at any point to the right of the knee may be then given by sqrt(abs(input)*knee)/input. This gain decrease at large amplitudes has been shown in simulation to stabilize the vehicle when subject to inputs that would otherwise destabilize the vehicle into an unrecoverable tumble. For the vast majority of maneuvers, this soft rate limit may be set high enough to not be noticeable.

With continued reference to FIG. 1, outer loop controller may be configured to receive an input datum, such as measurement datum 112 and/or pilot input datum 136, sensor 104. Input datum represents the pilot's desire to change an electric aircraft's heading or power output. In one or more embodiments, input datum may be transmitted to one or more components from, for example, operator input 136 to which it may be connected. Outer loop controller may include circuitry, components, processors, transceivers, or a combination thereof configured to receive and/or send electrical signals. Input datum and other inputs to this system may include pilot manipulations of physical control interfaces, remote signals generated from electronic devices, voice commands, physiological readings like eye movements, pedal manipulation, or a combination thereof, to name a few. Outer loop controller may include a proportional-integral-derivative (PID) controller. PID controllers may automatically apply accurate and responsive correction to a control function in a loop, such that over time the correction remains responsive to the previous output and actively controls an output. Controller 108 may include damping, including critical damping to attain the desired setpoint, which may be an output to a propulsor in a timely and accurate way.

With continued reference to FIG. 1, outer loop controller is configured to receive at least an aircraft angle from sensor 104, such as from an IMU, as previously described in this disclosure. Inertial measurement unit, as discussed, may be configured to detect at least an aircraft angle. Outer loop controller may include components, circuitry, receivers, transceivers, or a combination thereof configured to receive at least an aircraft angle in the form of one or more electrical signals consistent with the description herein. Outer loop controller is configured to generate rate setpoint as a function of at least an input datum. Controller may use an outer angle loop driving an inner rate loop to provide closed loop control with setpoints of desired pitch attitude, roll attitude, and yaw rate provided directly by the pilot. The outer (angle) loop provides a rate setpoint. Rate setpoint may include the desired rate of change of one or more angles describing the aircraft's orientation, heading, and propulsion, or a combination thereof. Rate setpoint may include the pilot's desired rate of change of aircraft pitch angle, consistent with pitch angles, and largely at least an aircraft angle in the entirety of this disclosure. Rate setpoint may include a measurement in a plurality of measurement systems including quaternions or any other measurement system as described herein.

With continued reference to FIG. 1, controller 108 may include an inner loop controller. Inner loop controller may be implemented in any manner suitable for implementation of outer loop controller. The inner loop of the controller may be composed of a lead-lag filter for roll rate, pitch rate, and yaw rate, and an integrator that acts only on yaw rate. Integrators may be avoided on the roll and pitch rate because they introduce additional phase lag that, coupled with the phase lag inherent to slow lift fans or another type of one or more propulsors, limits performance. Furthermore, it may not be necessary to have good steady state error in roll and pitch rate, which an integrator helps achieve in yaw rate. A final component of the inner loop may include gain scheduling on lift lever input. As previously discussed, the only controller change between low-speed flight and fully wing-borne flight may be this gain scheduling. At anything above the assisted lift input corresponding to zero airspeed flight, the full requested moment from the inner loop may be sent to a mixer. At assisted lift levels lower than this, the requested moment from the inner loop may be multiplied by a gain that linearly decays to zero. The exact shape of this gain reduction may be open to change slightly. Experimentation in simulation has shown that anything between a square root function up to the IGE average torque setting and the linear map shown above works acceptably. Because the moment that can be generated by the control surfaces in pitch may be such a strong function of angle of attack, the relatively small difference in hover moment achieved between the linear and square root maps may be washed out by the angle of attack variation in a transition. At low lift lever input, the plane would have to have significant unpowered lift (and therefore airspeed) to not lose altitude. In this case, the control surface effectivity will be significant, and full moment production from the lift motors will not be necessary. When the lift lever may be all the way down, the lift motors may stop rotation and stow into a low drag orientation. Then, the only control authority comes from the aerodynamic control surfaces, and the plane controlled exclusively via manual pilot inputs. On transition out from vertical to cruise flight, the coordination and scheduling of control may be intuitive and straightforward. In a non-limiting example, during the transition in, or decelerating from an aborted takeoff, it may be important that the pilot not decrease assisted lift below a 15% average torque threshold in order to maintain aircraft control and not develop an unrecoverable sink rate when operating in certain airspeed regimes such as the transition regime. A mechanical detent may be installed in the lift lever, throttle, or any control input, to provide proprioceptive feedback when crossing this threshold which should occur operationally only during the terminal phases of a vertical landing.

With continued reference to FIG. 1, inner loop controller is configured to receive an aircraft angle rate. Inner loop controller may be configured to receive the rate setpoint from the outer loop controller. Inner loop controller is configured to generate a moment datum as a function of the rate setpoint. Moment datum may include any information describing the moment of an aircraft. Moment datum includes information regarding an operator's desire to apply a certain moment or collection of moments on one or more portions of an electric aircraft, including the entirety of the aircraft.

With continued reference to FIG. 1, inner loop controller may include a lead-lag-filter. Inner loop controller may include an integrator. The attitude controller gains are scheduled such that full gain authority may be only achieved when, for example, the assisted lift lever may be less than 50% torque, which corresponds to an amount less than a nominal torque required to support the aircraft without fully developed lift from the wing. At average torque levels higher than 50% torque, the output of the inner loop (desired moment vector to apply to the vehicle) may be directly scaled down. This increase in moment generated at the lift rotors may be designed to be directly complementary to the increase in aerodynamic control surface effectivity as the dynamic pressure builds on the flying wing and the flying surfaces. As a result, the total moment applied to an electric aircraft for a given operator input may be kept near constant. For instance, and without limitation, outer loop controller may be consistent with disclosure of outer loop controller in U.S. patent application Ser. No. 17/218,428 and titled, "METHODS AND SYSTEMS FOR FLIGHT CONTROL CONFIGURED FOR USE IN AN ELECTRIC AIRCRAFT," which is incorporated herein by reference in its entirety. Furthermore, controller 108 may include a flight controller that may be responsible for mapping pilot and sensor inputs and conditions of electric aircraft 116, such as body angular rate or motor torque, to meet aircraft command 120. The flight controller may be consistent with disclosure of flight controller in U.S. patent application Ser. No. 17/218,428 and titled, "METHODS AND SYSTEMS FOR FLIGHT CONTROL CONFIGURED FOR USE IN AN ELECTRIC AIRCRAFT", which is incorporated herein by reference in its entirety.

With continued reference to FIG. 1, controller 108 may include a higher-level flight controller. Higher-level flight controller may include an outer loop flight controller which was previously described in this disclosure. Higher-level flight controller may include one or more computing devices consistent with this disclosure and/or one or more components and/or modules thereof. Higher-level flight controller may also include a lower-level flight controller. In a non-limiting embodiment, the flight control assembly 120 may serve as a higher-level flight controller and the higher-level flight controller may be configured to be a lower-level flight controller. Higher-level flight controller may be implemented using a microcontroller, a hardware circuit such as an FPGA, system on a chip, and/or application specific integrated circuit (ASIC). Higher-level flight controller may be implemented using one or more analog elements such as operational amplifier circuits, including operational amplifier integrators and/or differentiators. Higher-level flight controller may be implemented using any combination of the described elements of this disclosure or any other combination of elements suitable therefor. Higher-level flight controller may be configured to input one or more parameters, such as measurement datum 112 performance datum **, and output aircraft command 120. Higher-level flight controller may periodically detect one or more errors between aircraft angles and commanded angles in any one of pitch, roll, yaw, or a combination thereof. For example, and without limitation, higher-level flight controller may detect the error between the commanded and detected aircraft angle and command one or more propulsors and or flight components consistent with the entirety of this disclosure to reduce said error in one or more iterations. Higher-level flight controller may be closed by a PI controller with integral anti-windup via back-calculation. Additional logic is present to prevent integral windup while grounded on a not perfectly level surface. Gains may be reduced at large amplitude in order to reduce overshoot on large inputs. This excessive overshoot may be due in part to linear systems having constant percent overshoot, so at larger amplitudes, the absolute value of the overshoot becomes (potentially unacceptably) large. Additionally, on large step inputs, motor saturation (a nonlinear effect) may occur for extended periods of time and causes overshoot to increase. In extreme cases, the occurrence of motor saturation without any gain reduction may lead to unrecoverable tumbles. This gain reduction may be implemented as a (soft) rate command limit. In particular, this reduction may be given by the piecewise combination of a linear function and the square root function. Note that the input/output relationship may be monotonically increasing, so increased angle error or integral action always makes it through to the inner loop, even if the gain reduction may be engaged. For inputs less than the knee, set to 20 deg/s, the input may be not changed. Above the knee, the output may be given by sign(input) *sqrt(abs(input)*knee). The effective gain at any point to the right of the knee may be then given by sqrt(abs(input) *knee)/input. This gain decrease at large amplitudes has been shown in simulation to stabilize the vehicle when subject to inputs that would otherwise destabilize the vehicle into an unrecoverable tumble. For the vast majority of maneuvers, this soft rate limit may be set high enough to not be noticeable.

Figure 2B:
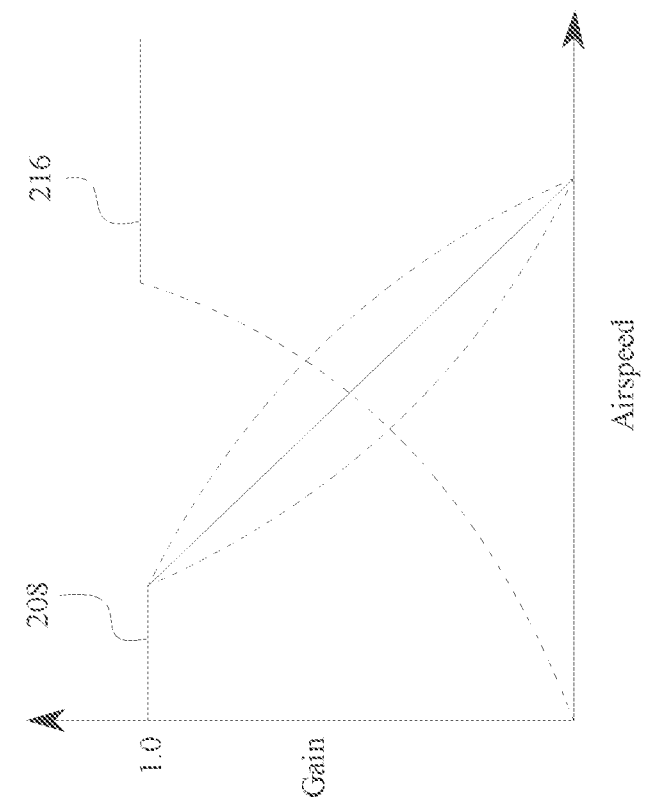
FIGS. 2A-2B are graphical representations of exemplary embodiments of control gain for an electric aircraft in accordance with one or more aspects of the present disclosure.
Figure 2A:
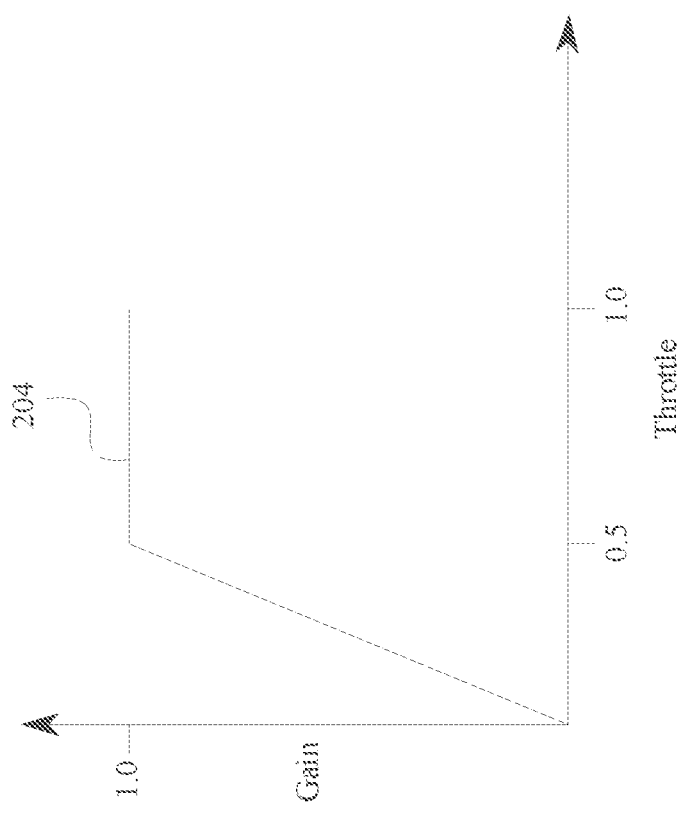

Now referring to FIGS. 2A-2B, exemplary graphs relating to gain scheduling are shown in accordance with one or more embodiments of the present disclosure. FIG. 2A shows a graph for an electric aircraft that is operated by a pilot. When electric aircraft 116 is driven by an operator, such as a pilot, measurement datum 112 may include throttle. Throttle may be an input by an operator via an operator input. FIG. 2B shows a graph for an electric aircraft that is automated. When electric aircraft 116 is automated, measurement datum 112 may be an airspeed of electric aircraft 116.

Figure 3:
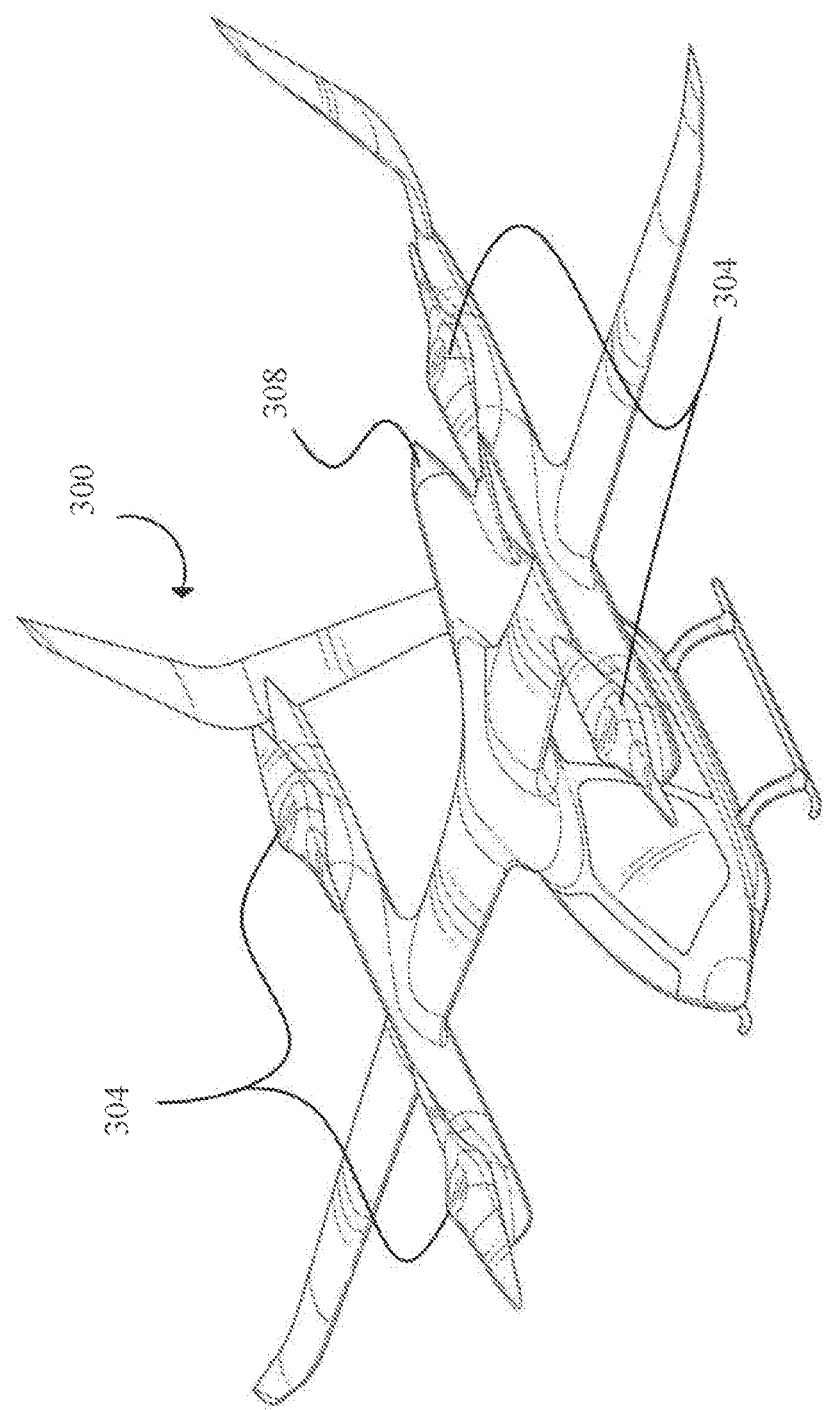
FIG. 3 is a front isometric view of an exemplary embodiment of an electric aircraft in accordance with one or more aspects of the present disclosure.
Figure 4:
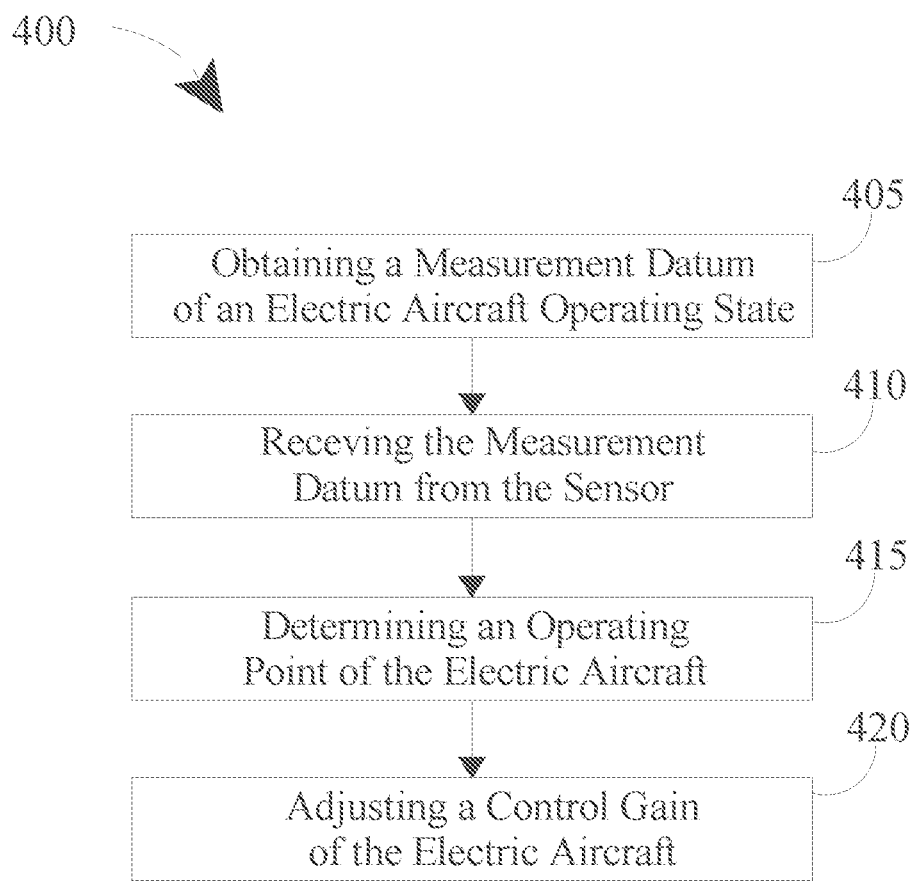
FIG. 4 is a flowchart of an exemplary embodiment of a method to control gain for an electric aircraft in accordance with one or more aspects of the present disclosure.

Now referring to FIG. 3, an exemplary electric aircraft 116 is shown in accordance with one or more embodiments of the present disclosure. In one or more embodiments, electric aircraft 116 may be a vertical takeoff and landing aircraft (eVTOL), as shown in FIG. 3. As used herein, a vertical take-off and landing (eVTOL) aircraft is an electrically powered aircraft that can take off and land vertically; eVTOL aircraft may be capable of hovering. In order without limitation to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," helicopter, or other vehicle that maintains its lift primarily using downward thrusting propulsors. Fixed-wing flight, as described herein, flight using wings and/or foils that generate life caused by an aircraft's forward airspeed and the shape of the wings and/or foils, such as in airplane-style flight. In other embodiments, electric aircraft 116 may be a drone (not shown). For example, and without limitation, electric aircraft 116 may be a four-rotor drone.

Referring still to FIG. 3, electric aircraft 100 may include at least a vertical propulsor 304 and at least a forward propulsor 308. At least a forward propulsor 308 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, take-off, and/or landing, and/or may propel the aircraft forward or backward on the ground. At least a vertical propulsor 304 and at least a forward propulsor 308 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 3, a "vertical propulsor" as used in this disclosure is a propulsor that propels an aircraft in an upward direction; one or more vertical propulsors may be mounted on the front, on the wings, at the rear, and/or any suitable location. A "propulsor," as used in this disclosure, is a component or device used to propel a craft by exerting force on a fluid medium, which may include a gaseous medium such as air or a liquid medium such as water. At least a vertical propulsor 304 may generate a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 3, a number of aerodynamic forces may act upon electric aircraft 116 during flight. Forces acting on an electric aircraft 116 during flight may include, without limitation, thrust, a forward force produced by a propulsor of electric aircraft 116, which may act parallel to a longitudinal axis of the aircraft. Another force acting upon electric aircraft 116 may include, without limitation, drag, defined as a rearward retarding force which is caused by disruption of airflow by any protruding surface of electric aircraft 116 such as, without limitation, a wing, rotor, and/or fuselage. Drag may oppose thrust and act rearward parallel to relative wind. A further force acting upon electric aircraft 116 may include, without limitation, weight, which may include a combined load of the electric aircraft 116 itself, crew, baggage, and/or fuel. Weight may pull electric aircraft 116 downward due to the force of gravity. An additional force acting on electric aircraft 116 may include, without limitation, lift, which may act to oppose the downward force of weight and may be produced by a dynamic effect of air acting on an airfoil and/or downward thrust from a propulsor of the electric aircraft. Lift generated by an airfoil may depend on speed of airflow, density of air, total area of the airfoil and/or a segment thereof, and/or an angle of attack between air and the airfoil. In a non-limiting example, electric aircraft 116 may be designed to be as lightweight as possible. Reducing weight of an aircraft and designing to reduce a number of components may optimize weight. To save energy, it may be useful to reduce weight of components of an electric aircraft 100, including without limitation propulsors and/or propulsion assemblies.

In one or more embodiments, electric aircraft 116 may include a flight component. For example, and without limitation, flight component may include a plurality of rotors. In one or more embodiments, a rotor may include an electric motor, a frame, a power source, or the like. In other embodiments, a rotor may include components such as a blade hub, a blade, a propeller, a rotor shaft, a torque arm, or the like. Flight component may be operated with a control gain. For example, and without limitation, rotors of electric aircraft 116 may implement operations to conduct a maneuver, such as a landing flare. A landing flare, or a round out, is a maneuver where the nose of an electric aircraft is raised relative to the center of gravity of the electric aircraft, which naturally slows the descent of the electric aircraft. Such a maneuver may be used to create a softer touchdown of an aircraft.

Figure 5:
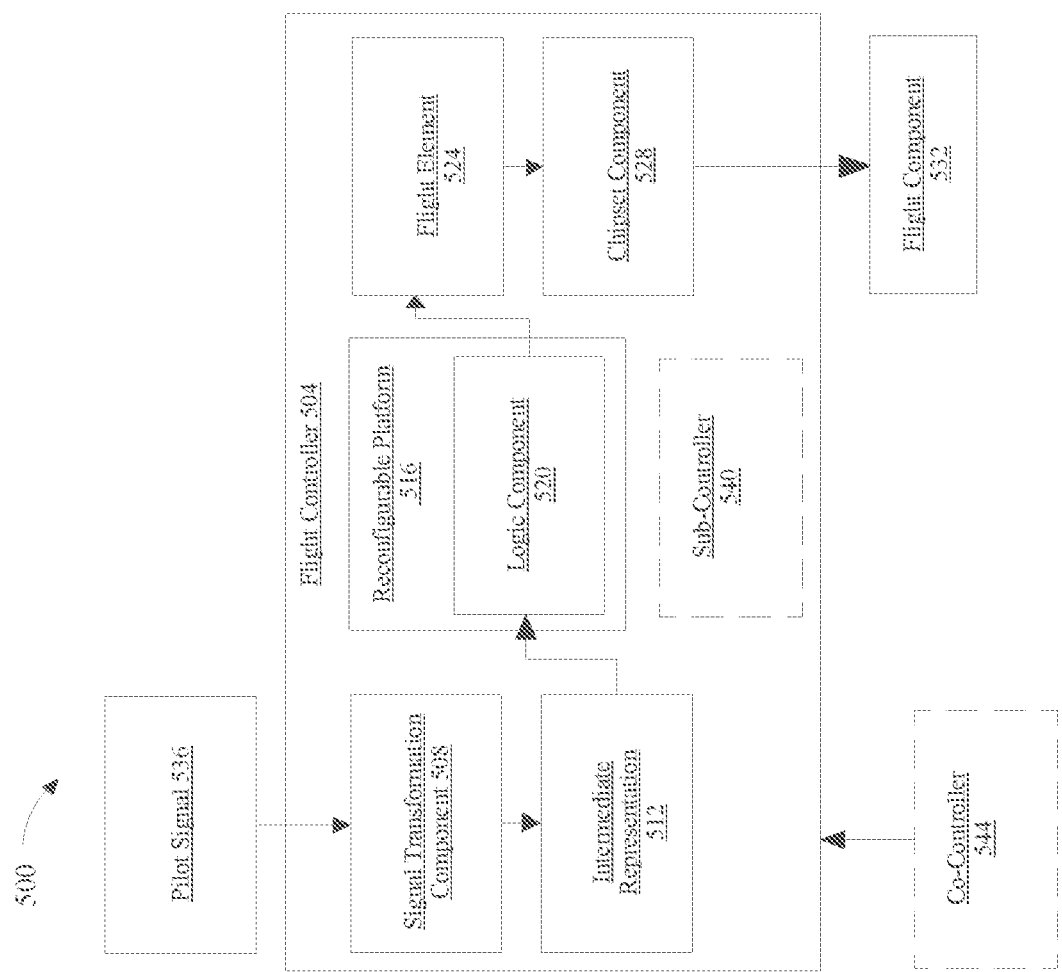
FIG. 5 is an exemplary embodiment of a machine-learning system in accordance with one or more aspects of the present disclosure.

Now referring to FIG. 5, a flow diagram of an exemplary embodiment of a method 500 to control gains for an electric aircraft is illustrated in accordance with one or more embodiments of the present disclosure. As shown in step 505, method 500 includes obtaining, by sensor 104, measurement datum 112 of electric aircraft 116. For example, a gyroscope may detect an orientation of electric aircraft 116 and sensor 104 may generate measurement datum correlated to the detected orientation of electric aircraft 116. In one or more embodiments, sensor 104 may include an inertial measurement unit (IMU). In one or more embodiments, measurement datum 112 may include an airspeed of electric aircraft 116. In one or more embodiments, measurement datum 112 may include the spin speed of a rotor blade of electric aircraft 116, such as revolutions per minute (RPM) of each rotor blade of a drone. In one or more embodiments, measurement datum 112 may include an operator input. For example, and without limitation, measurement datum 112 may include a lift throttle of electric aircraft 116 as determined by, for example, a pilot.

As shown in step 510, method 500 includes receiving, by controller 108, measurement datum 112 from sensor 104. In one or more embodiments, controller 108 may include a computing device, a processor, a control circuit, and the like. As shown in step 515, method 500 includes determining, by controller 108, operating point 124 of electric aircraft 116 as a function of measurement datum 112.

As shown in step 520, method 500 includes adjusting, by controller 108, a control gain of electric aircraft 116 as a function of a gain schedule and the operating point, where the adjusting the control gain of the electric aircraft includes transmitting aircraft command 120 to a flight component of electric aircraft 116. In one or more embodiments, aircraft command 120 may include an attitude change of electric aircraft 116. In one or more embodiments, attitude change may include a landing flare, as discussed previously in this disclosure. In one or more embodiments, aircraft command 120 includes a movement of flight component of electric aircraft 116.

Now referring to FIG. 5, an exemplary embodiment 500 of a flight controller 504 is illustrated. As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

Still referring to FIG. 5, in an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. As used in this disclosure a "flight component" is a portion of an aircraft that can be moved or adjusted to affect one or more flight elements. For example, flight component 532 may include a component used to affect the aircrafts' roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured generate an autonomous function. As used in this disclosure an "autonomous function" is a mode and/or function of flight controller 504 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 504 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 504 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine-learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
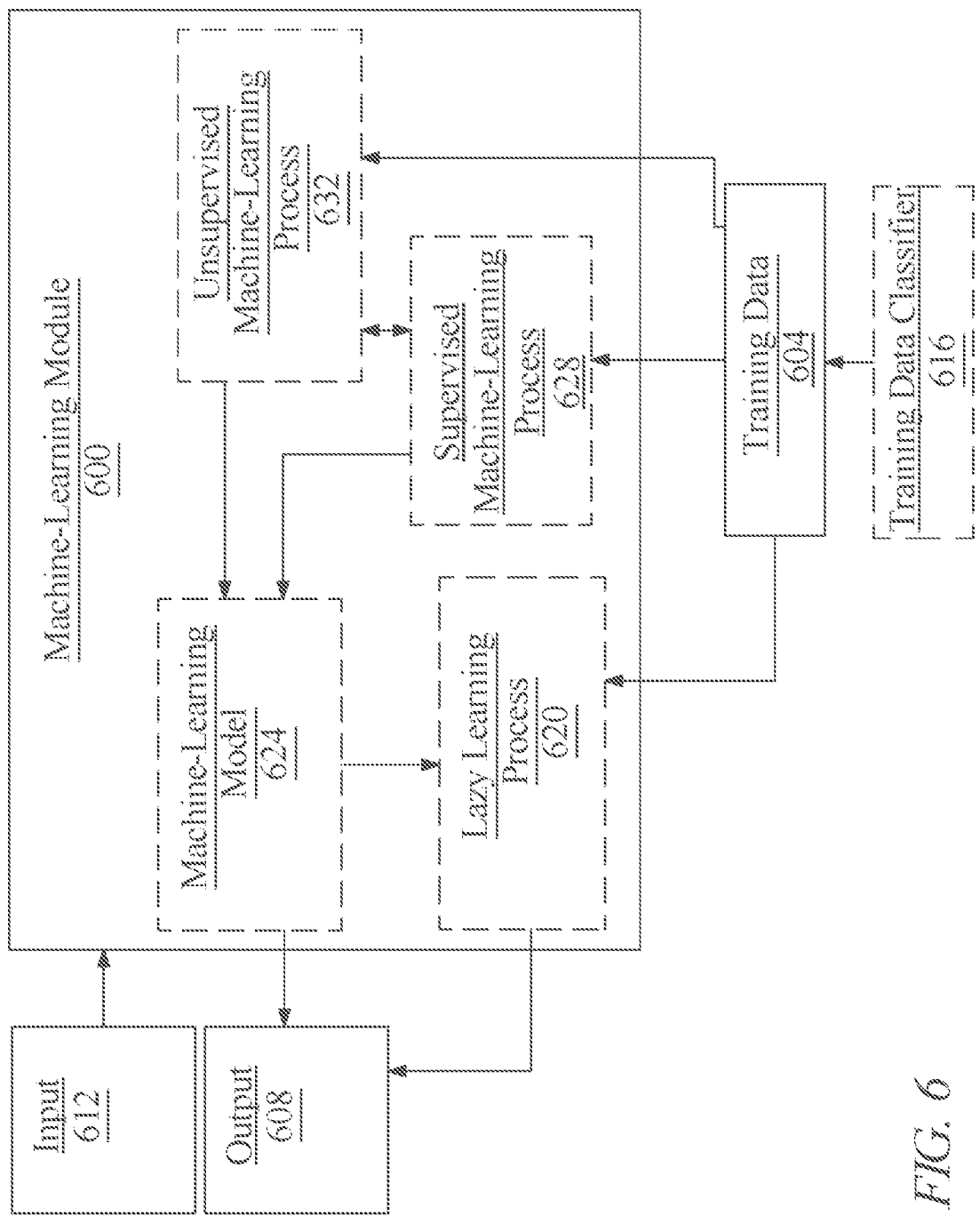
FIG. 6 is a block diagram of an exemplary embodiment of a flight controller system in accordance with one or more aspects of the present disclosure.

Referring now to FIG. 6, an exemplary embodiment of a machine-learning module 600 that may perform one or more machine-learning processes as described in this disclosure is illustrated. Machine-learning module 600 may be implemented in the determination of the flight states of the electric aircraft. Machine-learning module 600 may communicated with the flight controller to determine a minimal drag axis for the electric aircraft. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear problem may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial problem (e.g. a quadratic, cubic or higher-order problem) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
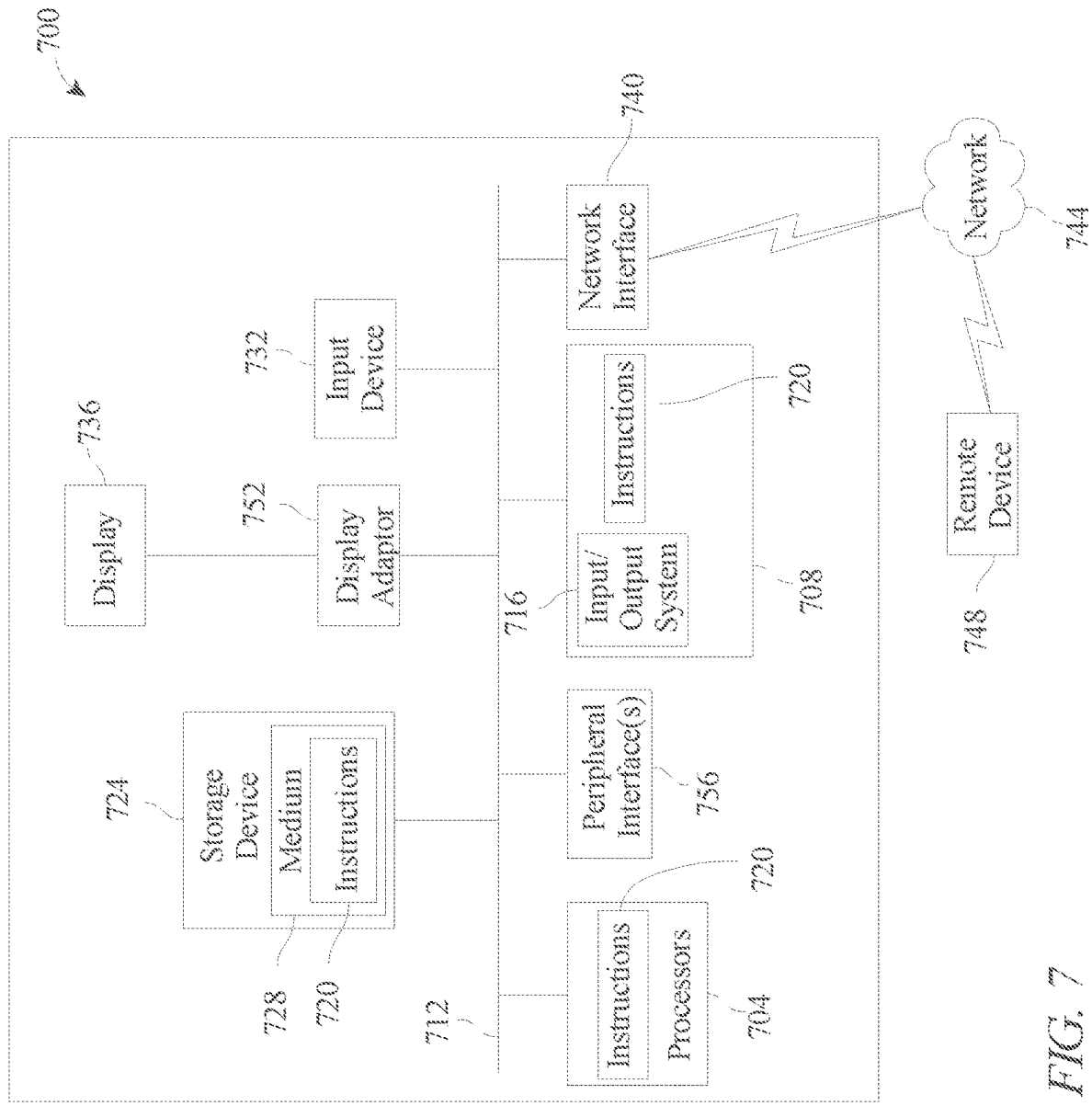
FIG. 7 is a block diagram of an exemplary embodiment of a computing system in accordance with one or more aspect of the present disclosure.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Still referring to FIG. 7, processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

With continued reference to FIG. 7, memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Still referring to FIG. 7, computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Referring to FIG. 7, computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

Still referring to FIG. 7, a user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

With continued reference to FIG. 7, computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system to control gains for an electric aircraft, the system comprising:
    a controller communicatively connected to a sensor, the controller configured to:
        receive a measurement datum from the sensor, wherein the measurement datum comprises a lift throttle of the electric aircraft when the electric aircraft is in manually operated flight, wherein the measurement datum comprises an airspeed of the electric aircraft when the electric aircraft is in automatedly operated flight, wherein the electric aircraft comprises an electric vertical takeoff and landing (eVTOL) aircraft;
        determine an operating point of the electric aircraft as a function of the measurement datum; and
        generate a gain schedule for executing a landing flare by the eVTOL aircraft as a function of a machine-learning model;
        adjust a control gain of the electric aircraft as a function of the gain schedule, wherein the gain schedule comprises:
            a first operating range, wherein if an operating point is within a first operating range, then the control gain is configured to be adjusted linearly and directly scaled; and
            a second operating range, wherein if an operating point is within the second operating range, then the control gain is configured to be adjusted based on a generated attitude command that pitches the electric aircraft upward by a predetermined angle, wherein the gain control comprises altering a position of one or more flight components of the eVTOL aircraft to pitch the eVTOL aircraft upward; and
        obtain a remaining vehicle torque, wherein remaining vehicle torque comprises remaining vehicle torque capability in a pitch moment of the eVTOL aircraft.
2. The system of claim 1, wherein:
    the first operating range includes a nominal airspeed range required to generate lift of the electric aircraft; and
    the second operating range includes a landing airspeed range used for preparation of touchdown of the electric aircraft.
3. The system of claim 1, wherein the measurement datum further comprises a spin speed of a rotor blade of the eVTOL aircraft.
4. The system of claim 1, wherein the measurement datum further comprises a pitch angle of a rotor of the eVTOL aircraft.
5. The system of claim 1, wherein the sensor comprises an inertial measurement unit (IMU).
6. The system of claim 1, wherein:
    the flight component comprises a control surface; and
    gain control schedule comprises at least altering a position of the control surface to adjust an orientation of the aircraft by a specific amount over certain duration of time.
7. The system of claim 1, wherein the controller comprises an outer loop controller and an inner loop controller.
8. The system of claim 1, wherein the aircraft command comprises a movement of a flight component of the electric aircraft to pitch the aircraft upward by the predetermined angle.
9. The system of claim 1, wherein the electric aircraft is a drone.
10. A method to control gains for an electric aircraft, the method comprising:
    receiving, by a controller communicatively connected to a sensor, a measurement datum from the sensor, wherein the measurement datum comprises a lift throttle of the electric aircraft when the electric aircraft is in manually operated flight, wherein the measurement datum comprises an airspeed of the electric aircraft when the electric aircraft is in automatedly operated flight, wherein the electric aircraft comprises an electric vertical takeoff and landing (eVTOL) aircraft;
    determining, by the controller, an operating point of the electric aircraft as a function of the measurement datum; and
    generating, by the controller, a gain schedule as a function of a machine-learning model;
    adjusting, by the controller, a control gain of the electric aircraft as a function of the gain schedule, wherein the gain schedule comprises:
        a first operating range, wherein if an operating point is within a first operating range then gain control may be adjusted linearly and directly scaled; and
        a second operating range, wherein if an operating point is within the second operating range then gain control may be adjusted based on a generated attitude command that pitches the electric aircraft upward by a predetermined angle.
11. The method of claim 10, wherein:
    the first operating range includes a nominal airspeed range required to generate lift of the electric aircraft; and
    the second operating range includes a landing airspeed range used for preparation of touchdown of the electric aircraft.
12. The method of claim 10, wherein the sensor comprises an inertial measurement unit (IMU).
13. The method of claim 10, wherein the controller comprises an outer loop controller and an inner loop controller.

14. The method of claim 10, wherein the aircraft command comprises a movement of a flight component of the electric aircraft to pitch the aircraft upward by the predetermined angle.

15. The method of claim 10, wherein the electric aircraft is a drone.

16. The method of claim 10, wherein the measurement datum further comprises a spin speed of a rotor blade of the eVTOL aircraft.

17. The method of claim 10, wherein the measurement datum further comprises a pitch angle of a rotor of the eVTOL aircraft.

18. The method of claim 10, wherein:

the flight component comprises a control surface; and gain control schedule comprises at least altering a position of the control surface to adjust an orientation of the aircraft by a specific amount over certain duration of time.

\* \* \* \* \*